No. 718,977. PATENTED JAN. 27, 1903.
H. BUDESHEIM.
NUT CRACKER.
APPLICATION FILED MAR. 23, 1901. RENEWED NOV. 14, 1902.
NO MODEL
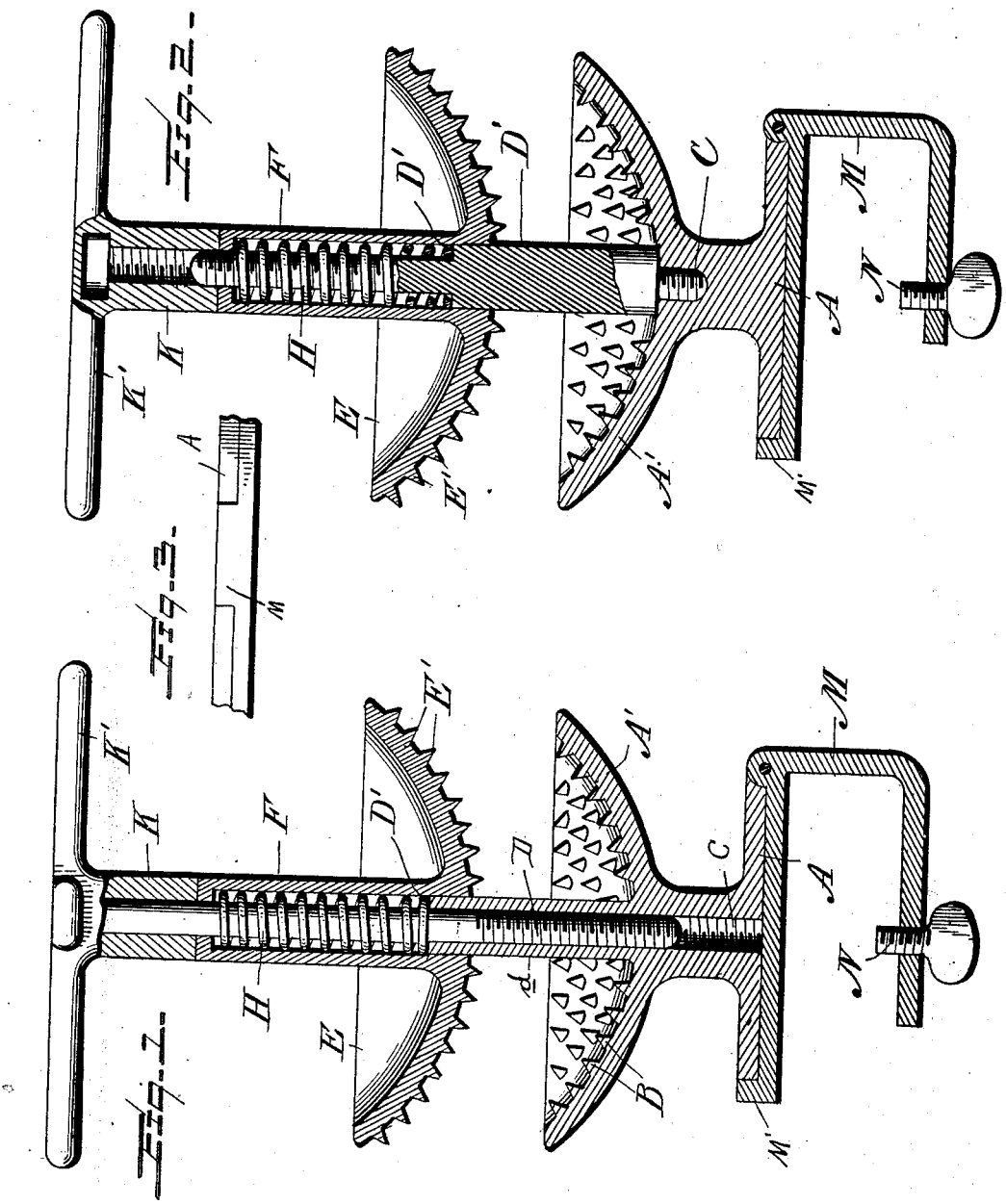
WITNESSES:
Wm. T. Doyle
J. M. Pfeiffer
INVENTOR
Harry Budesheim
BY
A. L. Hough
Attorney

UNITED STATES PATENT OFFICE.

HARRY BUDESHEIM, OF BALTIMORE, MARYLAND.

NUT-CRACKER.

SPECIFICATION forming part of Letters Patent No. 718,977, dated January 27, 1903.

Application filed March 23, 1901. Renewed November 14, 1902. Serial No. 131,391. (No model.)

*To all whom it may concern:*

Be it known that I, HARRY BUDESHEIM, a citizen of the United States, residing at Baltimore, in the State of Maryland, have invented certain new and useful Improvements in Nut-Crackers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in nut-crackers, &c.; and it consists in the provision of a saucer-shaped receptacle provided with suitable spurs or teeth on its upper concaved surface which coöperate with the teeth or spurs on a depressible convex disk to hold the nuts while being cracked as the disk is being screwed down toward the concaved receptacle, suitable means being provided to automatically raise the disk when the pressure is relieved, and means being provided to clamp the device to a table or other stationary object.

The invention will be hereinafter more fully described and then specifically defined in the appended claims and is illustrated in the accompanying drawings, which, with the letters of reference marked thereon, form part of this application, and in which drawings—

Figure 1 is a central vertical section through my improved nut-cracker. Fig. 2 is a central vertical sectional view of a slight modification of the device, and Fig. 3 is a detail view.

Reference now being had to the details of the drawings by letter, A designates the base of the concaved receptacle A', the upper surface of which is covered with spurs or teeth B, and in the center of said concaved receptacle is a threaded aperture C to receive the lower threaded screw D. Said threaded aperture passes up through the central boss $d$, which is integral with the receptacle A'. The depressible disk E, which is convexed on its under or bottom face, is also provided with spurs or teeth E', and this disk has a hollow shank portion F, which telescopes over said central boss $d$, and the upper end of the shank portion of the disk is apertured to receive the upper portion of said screw D, which is allowed to move freely through said aperture. Interposed between the top of said boss and the under surface of the top of the shank portion F is a coiled spring H, which serves to normally hold the disk E at its highest limit, but comes under tension as the shank portion is forced down.

K designates a socket shank portion of the handle K', which is apertured to receive the upper end of the screw D. The lower end of said socket portion K is designed to bear against the upper end of the shank portion F of the disk E, and when the handle is turned and with it the threaded bolt screwed down the shank portion of the handle is adapted to force said disk E toward the concaved receptacle and to crush the shells of nuts which may be placed upon or in said receptacle. When the handle is turned in the opposite direction, the coil-spring about the central threaded rod or screw D will automatically raise the disk E.

For holding the device rigidly I provide a clamping member M, which has a tightening-screw N, whereby said member may be held while the device is operated. The base portion of the receptacle may be either secured to this clamping member in such a manner as to be easily removed therefrom or it may be integral therewith. In the drawings I have shown the base A pivoted to said clamping member.

When the device is used as a lemon-squeezer, as it may be if desired, a duct (not shown) should be provided leading away from the receptacle at its lowest portion and through which the juice of the lemons may run.

To hold the free swinging end of the base from a lateral movement, the forward angled end M' of the clamp member is designed to fit in a notch in the free edge of the base A, as shown in Fig. 3.

In Fig. 2 I have shown a slight modification, in which instead of having a threaded and longitudinally-movable rod D passing through the two disks I provide a post $D^x$, which has its lower contracted end threaded and screwed into a threaded hole in the disk A', while the shank portion of the handle screws down over the threaded top of the post. In this modified form the post is shouldered and the spring H bears between said shoulder and the top of the shank portion F of the disk E.

By the provision of a device of this character it will be observed that when made of a strong metal and of sufficient size a large number of lemons may be squeezed at the same time, or nuts cracked, if used as a nutcracker.

Having thus described my invention, what I claim to be new, and desire to secure by Letters Patent, is—

1. A nut-cracker, comprising the flanged saucer-shaped receptacle with spurs on its concaved surface, a boss rising from the center of said receptacle, a depressible plate having spurs on its convex face, and provided with a hollow shank portion, adapted to telescope over said boss, a spring interposed between said boss and the inner wall of the apertured end of said shank portion, and a handle bearing against the outer end of the shank portion of the depressible plate, as set forth.

2. A nut-cracker, comprising a flanged saucer-shaped receptacle with spurs on its concaved surface, and having a hollow interiorly-threaded boss rising centrally from said receptacle, a depressible plate with spurs on its convex surface, and having a central hollow shank portion with one end open, its other end apertured, a screw-threaded rod passing freely through said apertured end and engaging the interior threads of said boss, a spring housed within said shank portion, and interposed between the upper end thereof and the end of the boss, a handle fitted to the upper end of said threaded rod, and having a hub portion bearing against the end of said boss, as set forth.

3. In combination with the nut-cracker as described, having a flanged receptacle, a clamp member hinged to said flange, an angled projection at the end of said clamp member, which is adapted to be seated in a notch in the free edge of said flange, as set forth.

In testimony whereof I hereunto affix my signature in presence of two witnesses.

HARRY BUDESHEIM.

Witnesses:
ENOCH HARLAN,
HARRY L. PRICE.